UNITED STATES PATENT OFFICE.

ALLEN LAPHAM, OF BROOKLYN, NEW YORK, ASSIGNOR TO HIMSELF AND JOSEPH B. BENNETT, OF SAME PLACE.

LARD-RENDERING KETTLE.

Specification of Letters Patent No. 18,622, dated November 10, 1857.

*To all whom it may concern:*

Be it known that I, ALLEN LAPHAM, of Brooklyn, Kings county, State of New York, have invented an Improved Steam-Kettle for Rendering Lard, Tallow, and Oils; and I do hereby declare the following to be a full, clear, and exact description thereof, reference being had to the accompanying drawings, figures, and letters of reference thereon, making part of this specification.

Of the said drawings Figure 1 shows a side view of my improved kettle. Fig. 2, is a vertical section. Figs. 3 and 4 are end views.

Similar letters of reference indicate like parts in all the drawings.

The nature of my invention consists in the employment of a kettle surrounded with steam and combining therewith an elevated hollow steam cylinder, placed in the center of the kettle and supported by pipes secured to the kettle and cylinder, whereby I am enabled to concentrate great heat, economize fuel, and render the kettle easy of access for the purpose of cleaning and removing impurities which collect upon the bottom by continued use.

To enable others skilled in the art to make and use my improved kettle, I will describe its construction and operation.

A represents the outer shell of the boiler or kettle.

B is the inner kettle, the upper edge of which is secured in the ordinary manner steam tight to the outer shell.

C is a vertical hollow cylinder supported on pipes D, D, secured steam tight to the cylinder, while their lower ends are secured in like manner to the bottom of the kettle, as plainly shown in Fig. 2.

E is the discharge pipe for drawing off the sediment and refuse matter from the kettle.

F is the condense water pipe.

G is the induction pipe for steam.

H is the draw off cock for taking the material from the kettle.

I is a man hole for cleaning the kettle.

Operation: The material to be rendered is placed in the kettle in the spaces marked *a, a, a*, and steam being admitted through the pipe G, it passes through the steam spaces *b, b, b, b*, at the sides of the kettle, and also through the pipes D D to the hollow vertical cylinder as plainly shown in Fig. 3, and thus surrounds the material to be rendered in a manner to contribute to the most useful effect in the distribution of heat. The condense water is drawn from the kettle by means of the pipe F as shown in Figs. 1 and 2. The material rendered is drawn from the kettle by means of the draw off cock H, at the side of the kettle as shown in the various figures.

Having discribed my improved kettle I will state what I desire to secure by Letters Patent.

I am aware of the patent of I. I. Bate, Oct. 21st, 1856, wherein is claimed the combination of a double steam kettle, with an annular chamber and I therefore disclaim any part of his invention.

J. R. BAIRD.
Ringing Bells.
No. 18,623.
Patented Nov. 17, 1857.
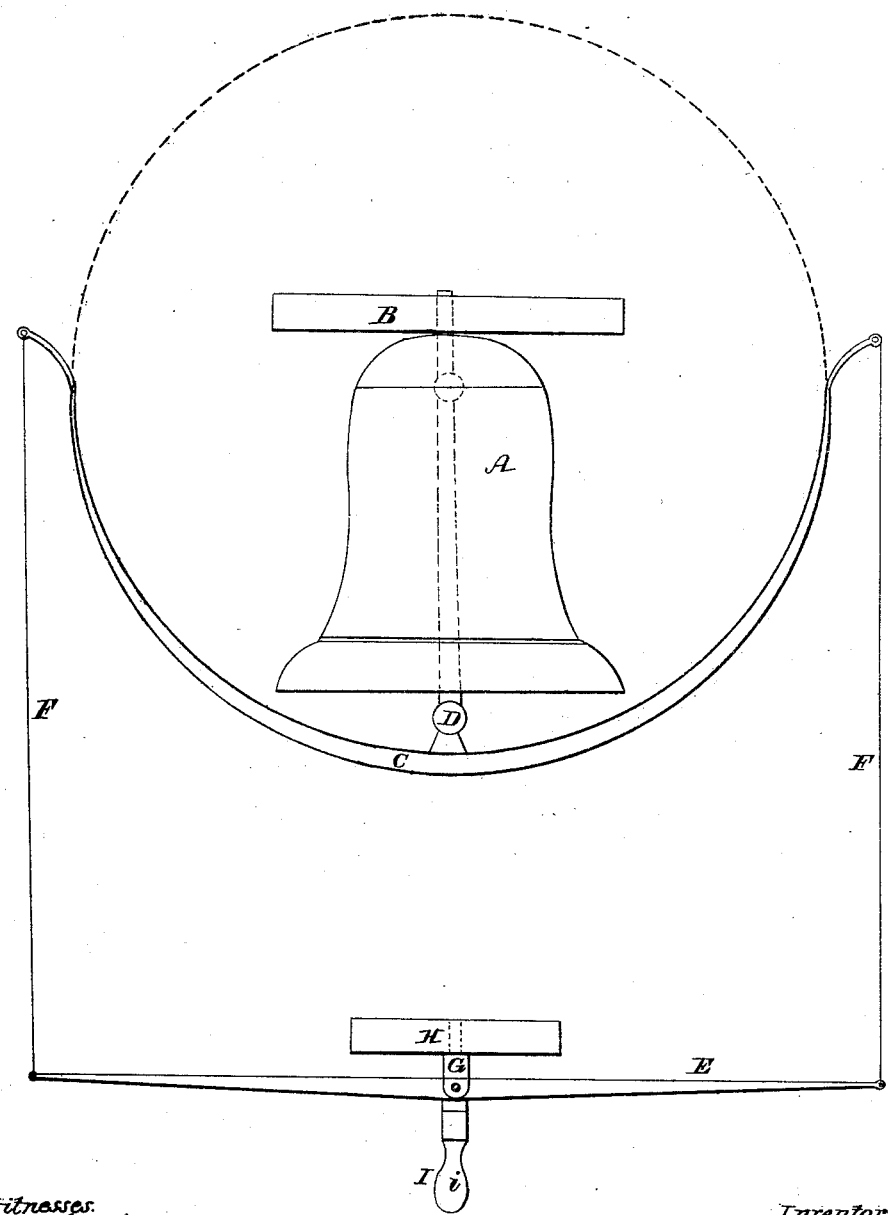

I claim—

In combination with a steam kettle a vertical hollow steam cylinder supported upon pipes D, D, as described, whereby I am enabled to concentrate great heat upon the material rendering, thereby saving fuel, and making the kettle easy of access for the purpose of cleaning substantially as set forth and specified.

ALLEN LAPHAM. [L. S.]

Witnesses:
C. A. DURGIN,
D. G. ROWLANDS.